Patented Jan. 15, 1952

2,582,764

UNITED STATES PATENT OFFICE 2,582,764

MANUFACTURE OF CARBON ELECTRODES

Bruce L. Bailey, Niagara Falls, N. Y., assignor to Great Lakes Carbon Corporation, New York, N. Y., a corporation of Delaware No Drawing. Application May 28, 1948,
Serial No. 29,943

10 Claims. (Cl. 18—54.7)

This invention relates to a process, and the product thereof, for manufacturing improved carbon electrodes and anodes useful particularly in the metallurgical industries, as well as other shaped carbonaceous articles.

Carbon electrodes have been made by incorporating calcined coke from various sources in a binder which coats the surface of the particles, and which upon subsequent extrusion or molding, followed by slow baking at temperatures up to about 2000° F. assumes a hard dense structure. It may be treated at temperatures above 4500° F. to graphitize it. In the commercial manufacture of electrodes it has been considered essential that the carbonaceous substance be calcined prior to mixing. It is stated in Mantell, "Industrial Carbon," D. Van Nostrand Company, New York, that there are four reasons why calcination of carbonaceous substances is necessary in the manufacture of carbon articles.

"1. The green materials when ground cannot readily be bound together to give proper density.

"2. They are difficult to mold or extrude.

"3. They give off their volatile matter during baking thus resulting in a very porous article.

"4. They are poor conductors and have a higher resistivity than the calcined material."

Standard commercial practice universally follows this procedure notwithstanding the fact that suggestions have been made in the prior art to the use of certain uncalcined materials.

Other carbonaceous substances such as lamp black, thermal-carbon-black, graphite, and the like which have been proposed for electrode manufacture are volatile-free and a binder is mixed with them before forming the green electrode. The binder wets the surface of the carbon particles, forming a film which binds one piece to the next when their respective binder films meet and join. Subsequent baking converts the binder to coke and the matrix thus set up holds the piece together.

According to the present invention, a raw petroleum coke having definite and critical properties can be made into an electrode by incorporating a plasticizer followed by treatment within critical operating limits and preferably in the absence of oxygen, to bring about alloying or plasticizing of the raw coke, and thereafter molding or extruding the electrode followed by baking and for some purposes graphitizing at temperatures higher than the baking.

The process of the invention has the advantage of eliminating the preliminary calcining step and of producing an electrode of high apparent density and strength, and of low resistivity and porosity.

Although the electrode art is extensive, improvements in manufacturing methods are needed particularly from the standpoint of cost because of the comparatively large amount of carbon that is consumed in the course of producing metals by the electrothermal processes. These processes consume large amounts of power so that even slight improvements in the electrical conductivity of the electrodes either with or without graphitizing are of great importance. Dense, relatively non-porous electrodes which are strong, not easily broken and which resist erosion are highly desirable in preventing delays due to breakage and replacement of electrodes, as well as from the standpoint of reduced carbon and power consumption. These factors must be balanced against one another, that is, the cost of electrodes consumed compared with power and time savings. The present invention affords a simple method for manufacturing a superior electrode at lower cost using readily available materials which can be prepared in the raw state to the correct specifications at materially lower costs than in the case with processes employing calcined coke.

In one specific embodiment the invention comprises comminuting a raw coke prepared by thermally cracking a liquid hydrocarbon oil, said coke having a volatile content within the range of about 8–16% and preferably about 8–16% exclusive of water, mixing the comminuted coke with a plasticizing agent which may advantageously be essentially aromatic in character, heating and mixing these components at a temperature in the range of about 100° F. to about 400° F. and preferably about 150° F. to about 325° F., to effect at least partial alloying of the plasticizer with the coke, said alloying step preferably being carried out in a non-oxidizing atmosphere, forming a green electrode by the application of mechanical pressure, such as molding, extrusion or casting, baking the formed electrode to carbonize it, and if desired, thereafter graphitizing the baked electrode thus produced.

These so-called petroleum cokes are essentially different in characteristics from coke produced from coal. The electrodes and anodes in which it is incorporated are superior in strength, density, porosity, and resistivity to those made from coal or other carbonaceous materials.

The raw coke employed in this process may include a substantial portion of material passing a 50 mesh screen, and may have some particles up to about 0.75 inch. Excellent results have been obtained using particles of about 4 to about 20 mesh. This means that the standard practice of using coke flour having substantial quantities of 200 mesh particles can be dispensed with in many cases, and greatly reduced in others. The grinding operation to produce coke flour is expensive, hence the present invention has the advantage of reducing the cost by eliminating or reducing the amount of coke flour used.

The raw coke may be obtained as an infusible residue by the thermal cracking or coking of petroleum hydrocarbon oils, cracked asphalts, straight run asphalts, coal tar pitch, wood tar pitch, and the like. An especially useful raw coke is that deposited in reaction chambers of thermal non-catalytic cracking processes.

Only those raw petroleum cokes can be employed in this process which have a volatile content within the range of about 8 to 20% and preferably about 8% to about 16%. Cokes with higher volatile contents (water not being included in these figures) tend to intumesce and give off large quantities of gas when the electrode from which it is made is baked, thus increasing the porosity of the finished electrode as well as its resistivity and also decreasing its strength. Such high volatile cokes result in uncontrollable shrinkage of the electrode during baking and often cause fissures, cracks and blisters to develop and may result in deformity of the electrode during the baking. Green electrodes may by my process shrink, but to a controlled and controllable extent determinable in advance. Raw petroleum cokes low in sulfur are preferred.

Raw cokes having a volatile content below about 8% do not alloy sufficiently. This results in the same disadvantages of the use of improperly calcined coke in the conventional electrode manufacturing process without the attendant advantages of the present process.

When the coke as obtained from the reaction chambers of thermal cracking plants has a volatile content above about 20% it can be heated under controlled conditions, which should avoid localized overheating, to reduce the volatile content to come within the range specified. This can be done at relatively low temperatures of about 500–1000° F. Care should be taken that oxidation does not occur and that the volatile content is not reduced to a point below that of the critical range set forth. It is particularly essential that the technique employed does not devolatilize a part of the coke to an extent outside of the range discussed while leaving part of the coke insufficiently devolatilized. The range of volatility given is not considered to be strictly an average value wherein part is under the limit and part over, nor can the desired properties of the coke be restored by the blending back of oil such as the overhead distillate from the coking or partial devolatilizing step, or by using more plasticizer. Cokes which are obtained from shell-type coking ovens should be selected so that a minimum proportion of overheated coke is included. Uniformity of volatile content is important.

The particle size of the coke employed may be within the range of that now used in the manufacture of carbon electrodes of various sizes. For large electrodes, e. g., 15 to 40 inches in diameter, particles of 0.75 inch diameter and below are used. For smaller electrodes finer coke is used. For some purposes raw coke "flour" having 40–60% through 200 mesh can be used, while for others it can be eliminated. The use of substantial proportions of calcined coke flour detracts from the finished electrode. Such pieces are poor, being of a honeycomb structure.

The selection of a plasticizer or alloying agent depends upon the type of electrode to be made. Any plasticizer which will partially alloy with the raw coke can be used for making baked or amorphous carbon electrodes. Not all are exactly equivalent as will be seen from the examples. For graphitized electrodes certain plasticizers are more desirable than others, and some may be considered unsuitable. Aromatic hydrocarbons are preferred especially for graphitized electrode manufacture. The oxygen or nitrogen derivatives of aromatic hydrocarbons are useful in the manufacture of amorphous electrodes, but are less desirable than the hydrocarbons for the graphitized electrodes. Cycloparaffinic hydrocarbons or their derivatives may be used, for example the furfural extract of heavy lubricating oils. Mixtures of the hydrocarbons and their derivatives may be used to advantage in many instances.

The plasticizer should not contain substantial amounts of substances which decompose to give strongly oxidizing decomposition products if graphitized electrodes are to be made. The plasticizer must have a boiling point and a decomposition point well above the temperature at which the alloying effect with the raw coke will take place. Otherwise, the effect cannot be obtained. Mere solvent or plasticizing effect on the coke is not enough.

Suitable substances for plasticizers include coil tar oils, coal tar pitches, wood tar pitch, anthracene oil, heavy wood tar oils and pitches, heavy lignite tar oils and pitches, phenanthrene, diphenyl, anthracene, and the like.

Among the plasticizers that may be used are substituted aromatic compounds. Among the useful compounds are those having chloro, hydroxy, methoxy, amino or nitro groups substituted in the ring. Specific examples include nitrobenzene, m-dinitrobenzene, o-nitrophenol, o-nitroanisole, o-nitroaniline, o- and m-nitrochlorobenzene, 2,4,dinitrochlorobenzene, mono- and di-nitrotoluene, mono- and di-nitroxylenes, o-nitrodiphenyl, α nitronaphthalene and others. These are useful as the sole plasticizing agent, but are particularly useful in combination with other plasticizers such as coal tar pitch, coal tar oil, and the like. The compounds are generally employed in minor proportions of the pitch. They should boil above about 350° F. and melt below about 200° F.

Heavy petroleum hydrocarbon residues and asphalts, whether cracked or straight run, may be used as plasticizers for use in amorphous electrode manufacture but yield graphitized electrodes having high resistivity. The porosity of electrodes made with hydrocarbon oil plasticizers is often greater than those made with the aromatic oils described.

Certain high boiling hydrocarbon oils and residues produced in catalytic cracking of hydrocarbon distillates can be employed provided they meet the other requirements of a plasticizer. Aromatic solvent-extracts having the desired boiling range may be used. Furfural or sulfur dioxide extracts either aromatic or naphthenic in character may be used. Mixtures of plasticizers may also be used, sometimes to great advantage.

The plasticizer must be capable of being converted during the baking step into high percentages of carbon and should not distill out of the electrode during the baking step. It should not vaporize or decompose substantially below about 500° F. Of course, in the baking operation a certain amount of volatile hydrocarbons and other by-products resulting from the pyrolysis of the plasticizer are obtained, but the most desirable plasticizers are those which are converted to a large extent into coke. Excessive production of vapors and gases tend to increase porosity. High sulfur content materials are undesirable, tending toward higher resistance and lower apparent density.

The comminuted coke and the plasticizer can be preliminarily mixed where this is practical, particularly if the plasticizer is in finely divided solid condition. Likewise those plasticizers which are normally liquid can be mixed cold with the coke. In general, the method of mixing is to heat the coke, or a fairly uniform mixture of coke and plasticizer, to a temperature in the range of about 100–400° F. and preferably 150–325° F. and carry on a mixing step in any suitable type of equipment, preferably in the absence of oxygen or other oxidizing materials, so that mixing and alloying take place simultaneously. Under special circumstances the cold mixture, which in this instance must be uniform, can be formed into the electrode and this followed or accompanied by an alloying treatment in the temperature range above given. The proper temperature for this alloying treatment is quite critical and will vary depending upon the volatile content of the raw coke and the viscosity of the plasticizer employed. If the formed piece passes through the heating stage too fast, the plasticizer will not have time to soften the raw coke enough to permit the relieving of strains set up in the forming operation. Instead, it will penetrate too deeply into the raw coke particles due to increased fluidity, thus not softening the surfaces to allow a relief of stresses and formation of a high strength matrix. This alloying treatment should preferably be carried out in a non-oxidizing atmosphere.

In certain instances, the mixing can be carried out with the raw materials warmed, e. g., 100–200° F., but at a temperature below that at which the alloying effect is complete and this followed by treatment at a higher temperature, for example 250–365° F.

In the preferred method in which the best results are obtained, care must be taken that the alloying treatment is controlled so that it does not proceed too far. This usually can be controlled by the temperature used, although time has a substantial effect. If a mixture of a plasticizer and coke is heated while mixing at a temperature above the range given, it goes through first a pasty form and then the mixture changes in character and becomes too dry to extrude and difficult to mold. The plasticized coke should furnish its own lubrication effect on the dies. With certain plasticizers, this over treatment may occur in the temperature range given if the time is extended too long, say, beyond sixty minutes. The criticality of the time and temperature relationship in the alloying step varies with the amount and kind of plasticizer employed. It also varies with the volatile content and particle size of the raw coke. The smaller coke sizes alloy rapidly because of the large surface and small diameter of the coke.

If the alloyed mixture has gone to a point beyond that readily extrudable or moldable, the mixture not only becomes difficult to extrude and results in the formation of electrodes which may develop imperfections and may be of lower apparent density and higher resistivity than is desirable. When a mixture has been carried too far in the alloying step, it is possible in certain instances to add a small additional amount of plasticizer to restore its extruding characteristics but if the proportion of added material is too high, the baked or graphitized electrode may develop increased porosity due to increased volume of vapors that must be driven off. Shrinkage of the baked electrode is also increased. In every event the temperature of alloying must be below that at which the material begins to decompose or to distill out of the mixture to any substantial extent, or becomes so fluid as to penetrate raw coke aggregates too deeply. Experience following the conditions of the examples will soon establish the desired consistency to skilled workers.

The step of forming the electrode may be carried out with any suitable apparatus such as conventional extruders and molding machines. Other shaped articles such as blocks can be cast.

The time of the baking step employed with the present process can be materially reduced over that used in conventional processes of electrode manufacture described above.

Plasticized petroleum coke that may be employed in this process must, after extrusion, be of a character in which there is little plastic and no liquid flow during any stage of the baking operation. If the coke has too high a volatile content or if the plasticized mixture tends to melt and flow before decomposition of the decomposable components of the unbaked electrode has occurred, the minute channels from the interior of the electrode to the exterior by which the decomposition vapors escape will tend to seal off, resulting in the production of large pores and even deformed pieces. However, when prepared with the materials and according to the method outlined, such flow does not occur and the vapor escape channels remain small and uniformly dispersed throughout the body of the electrode, so that the gases can escape rapidly and without the production of large pores or channels.

The time and rate of heating must be controlled with great care and takes place over a relatively long period of time. Conventional practice in electrode baking to produce amorphous electrodes are followed. It requires about six days to reach a temperature of about 950° F. in the baking furnace, and the total heating time may be from 12 to 20 days.

The baking is carried out by gradually bringing the temperature to about 1400° F. to about 2000° F., the earlier part of the baking requiring the slowest upheat rate. This carbonizes a part of the volatiles of the coke and expels the remainder as vapor. The rate of vapor evolution has a pronounced effect on the finished electrode. For certain articles temperatures above 1000° F. may be used, the treatment being continued until further heating at higher temperatures results in no more than 5% loss of weight.

Another advantage of this process lies in the fact that the alloyed and formed electrodes have less tendency to deform during the baking stage as is often the case with the conventional type of electrodes. With the conventional type of electrode using calcined coke, the binder merely forms a surface coating around the calcined coke particles. The binder melts and blends with that on surrounding particles before it eventually carbonizes. At this molten stage, improperly supported electrodes will deform easily. The binder then carbonizes leaving a network of bonds between the coke particles. Breaking a conventional electrode requires breaking a large number of filament like carbon bonds. To break the present electrode requires a fracture of the whole piece. The result is that the present electrode has greater strength.

In the case of unbaked electrodes made by the present process the coke and the plasticizer are so intimately mixed and dispersed that at no time during the heating step is a liquid phase formed which is capable of movement except possibly upon the application of considerable mechanical pressure. Instead of hard solid particles with film like bonds of carbon holding them together at points where they touch (as in conventional electrodes), the electrode is essentially one piece of carbon. Consequently, the rejection of electrodes, because of distortion in the baking step is largely eliminated by the subject process.

The baked carbon electrode of this invention can be used in those processes which employ carbonaceous electrodes, such as the aluminum industry, or the baked electrode can be subjected to graphitizing at a temperature above about 2500° F., generally around 4000–5000° F. This graphitization produces electrodes of great utility especially in the electrothermal production of steel and alloys, and of other metals. The electrodes of this invention can be made in any shape, e. g., round, oval, rectangular, and the like, that is conventionally used.

The term "coke" as used herein unless otherwise stated refers to solid residues made by carbonizing liquid or liquefiable hydrocarbons, particularly those of petroleum origin, whether obtained by the direct coking of the hydrocarbon or produced during cracking of oils by thermal methods.

The advantages of the process over conventional operation may be summarized as follows:

1. Substantially higher strength, higher apparent density, lower resistivity, fewer and smaller pores, and a more impervious structure.

2. Raw coke is more readily crushed than calcined coke, thus reducing grinding costs. Since fines are not required, the crushing process is cheaper.

3. Savings in power cost and use of greater power input for a given size electrode result when these electrodes are used. This is especially important for large electrode sizes, in large furnaces. To obtain greater power input by increasing electrode sizes results in damage to furnace refractories, hence the greater conductivity of the electrodes of this invention is a real advantage.

4. Reduced cost due to (a) elimination of the calcining step; (b) reduced baking time; (c) use of less expensive and more economically operated baking furnaces such as tunnel kilns, not considered practical with conventional electrodes.

The advantages of eliminating the calcining steps are twofold: first because the step is dispensed with; and secondly there is a saving of coke which is lost due to burning which occurs when air leaks into the kilns.

5. The articles made by this method act like thermosetting rather than thermoplastic materials, hence distortion, deforming and slumping during baking is minimized, making possible the use of less expensive methods of baking.

Other shaped articles can be cast, molded or extruded from the above mixtures. These include anodes for aluminum pots, pins for electrodes, arc light carbons, carbon brushes, carbon bricks, carbon blocks, carbon specialties such as tubes, bearing rings, plates, and the like, where a relatively impervious, strong composition is essential. Such articles are put through the baking step but not necessarily graphitized.

The following examples are given to illustrate the process employing various plasticizers and should be considered as illustrating but not necessarily limiting the invention to the exact conditions or materials described therein.

EXAMPLE I

The mixtures were prepared by intimately mixing raw petroleum coke having the indicated volatile content with 100 parts of coke and the indicated parts of plasticizer on a weight basis. The mixture was then plasticized by heating to a temperature of 300° F. for 30 minutes, mixing being continued during this time. The alloyed mixture was then placed in a mold at about 200° F. and formed into a specimen at 2000 pounds per square inch pressure using a hydraulic press. The data are presented on a comparative basis using a commercial calcined coke-pitch binder electrode as the base value of 100.

After molding, the specimen was baked in a gas fired furnace, the temperature being raised at a rate of about 5° F. per hour over a period of eight days. The ultimate temperature was 1740° F. after which the specimens were cooled and then removed to a graphitizing furnace wherein they were subjected to graphitizing to a temperature of 5070° F.

The apparent density (AD) and specific resistivity in ohms per inch cubic was determined and these are reported in the tables on a comparative basis.

The coal tar pitch employed is one used regularly as an electrode binder and had the following properties: 185° F. melt point by the cube in air method, and 25% benzol insoluble material. The asphalt was a cracked petroleum asphalt having a ring and ball softening point of 135–140° F.

The coal tar resin was a solid coal tar derivitive with a softening point of 130–150° F. and specific gravity of 1.22–1.32.

The BRV is a special coal tar oil of high boiling range and specific gravity of 1.13–1.17. It distills above 560° F.

The furfural extract was obtained by the solvent extraction of lubricating oil and was largely composed of cycloparaffinic hydrocarbons.

The data in Table I illustrate the effect of various plasticizers with raw coke from cracking a Texas crude oil, as compared with the conventional electrode using calcined coke. Improvements in both apparent density and conductivity were obtained in every instance. The raw coke contained 12.3% volatile and the calcined coke less than 1.0%

Table I

PROPERTIES OF BAKED ELECTRODES

| Formulation—Solvent | | | Electrodes—Baked | |
| --- | --- | --- | --- | --- |
| Raw Coke Parts | Parts | Kind | Apparent Density | Resist. 10⁻⁴ |
| 100 [1] | 38 | Coal Tar Pitch | 1.3 | 40.0 |
| 100 | 26 | o-cyclohexylphenol | 1.55 | 27.0 |
| 100 | 26 | Coal Tar Resin | 1.65 | 26.0 |
| 100 | 26 | BRV | 1.70 | 20.0 |
| 100 | 26 | —Nitronaphthalene | 1.63 | 26.0 |
| 100 | 26 | Furfural Extract | 1.38 | |
| 100 | 26 | Coal Tar Pitch | 1.56 | 24.0 |
| 100 | 10 | —Nitronaphthalene | 1.57 | 27.0 |
| 100 | 10 | Asphalt | 1.51 | 28.5 |
| 100 | 10 | Coal Tar Resin | 1.57 | 26.0 |
| 100 [2] | 10 | Coal Tar Pitch | 1.59 | 25.6 |

[1] Calcined coke with commercial coal tar binder.
[2] 10.7% volatile in the raw coke.

Table II contains the data obtained when the electrodes of Table I were graphitized. The calcined coke electrode is assigned the value of 100. The values for the plasticizers are presented on a directly comparative basis.

With the exception of furfural extract, the apparent densities were all improved, the comparative values being from 109 to 120. The aromatic type plasticizers show particularly improved densities.

The conductivity was also improved as shown by the lowered resistivity. These values range from 45.5 to 95.2. Here again the aromatic plasticizers, and particularly the coal tar products, show to advantage.

The asphalt plasticizer gave little improvement in apparent density and resistivity of the graphitized electrodes. This plasticizer is more useful in baked electrodes than in those to be graphitized as may be seen by reference to Table I.

The data also show that there is an optimum proportion of plasticizer to raw coke. This varies depending upon volatile content and particle size of the coke, as well as upon the plasticizer used. If either the volatile content or the proportion of plasticizer is too low, the improvement in apparent density and conductivity is decreased. In general, less than 40% by weight of plasticizer is used. The preferred range is about 10 to about 20% of plasticizer. Too much plasticizer results in imperfect electrodes.

*Table II*

| Plasticizer | | Graphitized Electrode | | |
|---|---|---|---|---|
| Kind | Parts | A. D. | Resistivity | Appearance |
| Coal Tar Pitch | 38 | ¹100 | 100 | Good. |
| Coal Tar Pitch | 26 | 110 | 49.2 | Blistered. |
| Coal Tar Pitch | 10 | 113 | 54.9 | Good. |
| Anthracene Oil | 26 | 120 | 45.5 | Do. |
| Coal Tar Resin (C) | 26 | 119 | 51.5 | Do. |
| Coal Tar Resin (c) | 10 | 112 | 72.7 | Do. |
| BRV | 26 | 120 | 45.5 | Do. |
| Furfural Extract | 26 | 100 | 70.5 | Do. |
| O-cyclohexyl Phenol | 26 | 112 | 83.3 | Do. |
| Nitro-Naphthalene | 26 | 119 | | Poor, cracked. |
| Nitro-Naphthalene | 10 | 110 | | Do. |
| Asphalt | 10 | 109 | 95.2 | Good. |
| Coal Tar Pitch | 10 | 110 | 70.0 | Do. |

¹ Calcined coke.

o-Cyclohexylphenol and nitro-naphthalene are particularly useful in combination with other plasticizers. A mixture was made of one part of either of these compounds with three parts coal tar pitch. A mixture with raw coke was made using 20 parts of the combined plasticizer, and formed into an electrode. The apparent densities and conductivity of these were improved over those obtained with the corresponding individual plasticizers. Moreover the appearance of the electrodes was good. No cracks, blisters or other defects developed.

There is a substantial shrinkage of the electrodes because of the comparatively high volatile content and because the coke had not been previously calcined. However this shrinkage is uniform in all directions and can be controlled so that by starting with an extruded or green electrode of a predetermined composition and of a size in excess of that desired in the final electrode, controlled and controllable shrinkage is obtained resulting in an electrode of the desired dimensions.

The materials can be baked and then machined, for example, to make pins or dowels for joining electrodes. The superior strength and conductivity makes them especially useful for this purpose.

EXAMPLE II

A raw Texas petroleum coke having 10.7% volatile matter (exclusive of water) was used, the mixing procedure being as above described. The calcined coke was from the same source and had 52% through 200 mesh. The raw coke had 35% through 200 mesh.

| | Calcined Coke + Coal Tar Pitch | Raw Coke + Coal Tar Pitch |
|---|---|---|
| Resistivity | 100 | 74.2 |
| Cross Bending Strength | 100 | 218 |
| Apparent Density | 100 | 113 |
| Wt. loss green to graphitized, percent | 20.1 | 22.8 |

The samples were baked according to standard procedure at 1000° F. in a commercial furnace and then graphitized at 5070° F. These conditions have been found best for commercial practice using calcined coke. Thus every advantage was given the conventional electrode.

The results showed improvement in resistivity and apparent density. The improvement in cross bending strength for the plasticized raw coke samples over the conventional type was especially marked, the electrode of this invention being more than twice as strong.

EXAMPLE III

A seven-inch diameter block was made by molding a coal tar pitch plasticized coke of Example II at 300° F., then baking and graphitizing it as above described. The coke was through a 4 and on a 20 mesh screen. The proportions by weight were 84.6% coke, 15.4% plasticizer. An improvement of 28% in resistivity and 14% in apparent density was obtained on the graphitized block over conventional blocks. The cross breaking strength was more than double that of the conventional calcined coke block. There was no evidence of distortion or cracking and the appearance of both the baked and the graphitized block was good.

EXAMPLE IV

An electrode made with lignite tar pitch plasticizer in the manner and proportions described for Example I has a comparative apparent density of 110 and resistivity of 70.

EXAMPLE V

The electrodes were extruded using coke and coal tar binder. The coke was a mixture of 8–20 mesh particles and −200 mesh flour in proportions of 60 particles and 40 parts flour. The calcined coke was mixed with 36 parts binder and the raw coke with 20 parts plasticizer. The results are shown in Table III.

*Table III*

COKE+PITCH 1⅛″ ELECTRODE

| Treatment | Source | Graphitized | | | |
|---|---|---|---|---|---|
| | | | | Strength | |
| | | A. D. | Res. | Transverse | Compression |
| Calcined | Pennsylvania | 1.57 | 33.5 | 1,400 | 2,500 |
| Raw | do | 1.58 | 24.9 | 3,180 | 3,500 |
| Calcined | Texas | 1.51 | 39.0 | 1,800 | |
| Raw | do | 1.53 | 27.3 | 3,630 | 4,550 |

The results show marked improvement in conductivity and especially in the strength of the electrodes.

EXAMPLE VI

Extruded 0.5 inch diameter electrodes were made in a similar manner to those of Example V but using 50-100 mesh particles. The flour was from Texas coke. Forty-two parts coal tar pitch was used with the calcined coke and 36 parts with the raw coke. The improvement in apparent density, conductivity and strength is outstanding as may be seen from Table IV. This was true of both baked and graphitized electrodes.

The results also show that larger proportions of plasticizer are necessary with more finely divided raw coke.

Table IV
0.5 INCH EXTRUDED ELECTRODES

| Treat. | Source | Baked | | Graphitized | | | |
|---|---|---|---|---|---|---|---|
| | | | | | | Strength | |
| | | A. D. | Res. | A. D. | Res. | Transverse | Compression |
| Calcined | Penn | 1.51 | 20.0 | 1.58 | 35.0 | 4,815 | 6,700 |
| Raw | do | 1.65 | 15.5 | 1.70 | 21.9 | 7,060 | 8,400 |

I claim as my invention:

1. A process for making shaped carbon bodies which comprises forming a mixture of particles of raw, uncalcined coke made by coking a heavy, liquifiable, hydrocarbon to a volatile content exclusive of about 8% to about 20%, and a plasticizing agent, said plasticizing agent being largely converted to carbon under the baking conditions and being neither substantially vaporizable nor substantially thermally decomposable below 500° F.; at least partially alloying said plasticizing agent with said coke particles to convert said coke particles to a material which is plastic under applied mechanical pressure by heating said mixture to a temperature of about 100° F. to about 400° F., said heating being discontinued before the alloy formed is rendered non-plastic; compressing the hot plastic material so produced to form a shaped body; and baking said shaped body with a gradual upheat to about 1000° F. to 2000° F. to carbonize it.

2. A process for making shaped carbon bodies which comprises crushing a raw uncalcined coke made by coking a heavy liquifiable hydrocarbon to a volatile content exclusive of water of about 8% to about 20%, mixing the so-crushed coke with a plasticizing agent, said plasticizing agent being largely converted to carbon under the baking conditions and being neither substantially vaporizable nor substantially thermally decomposable below 500° F.; at least partially alloying said plasticizing agent with said coke particles to convert said coke particles to a material which is plastic under applied mechanical pressure by heating said mixture to a temperature of about 100° F. to about 400° F., said heating being discontinued before the alloy formed is rendered non-plastic; compressing the hot plastic material so produced to form a shaped body; and baking said shaped body with a gradual upheat to about 1000° F. to 2000° F. to carbonize it.

3. The process of claim 2 wherein the plasticizing agent is an aromatic compound.

4. The process of claim 2 wherein the plasticizing agent is an aromatic hydrocarbon.

5. The process of claim 2 wherein the plasticizing agent is a coal tar derivative.

6. The process of claim 2 wherein the plasticizing agent is anthracene oil.

7. The process of claim 2 wherein the plasticizing agent is coal tar pitch.

8. The process of claim 2 wherein the plasticizing agent is used in an amount of about 10 to about 40%.

9. The process of claim 2 wherein the plasticizing agent is used in an amount of about 10 to about 20%.

10. The process of claim 2 wherein the liquifiable hydrocarbons are of petroleum origin.

BRUCE L. BAILEY.

REFERENCES CITED

The following references are of record in the file of this patent:

UNITED STATES PATENTS

| Number | Name | Date |
|---|---|---|
| 887,123 | Price | May 12, 1908 |
| 1,215,700 | Pike | Feb. 13, 1917 |
| 2,088,422 | Kemmer | July 27, 1937 |
| 2,502,183 | Swallen | Mar. 28, 1950 |